(12) United States Patent
Gilicinski et al.

(10) Patent No.: US 8,057,957 B2
(45) Date of Patent: *Nov. 15, 2011

(54) FUEL SOURCE FOR A FUEL CELL

(75) Inventors: Andrew G. Gilicinski, Westborough, MA (US); Bryan L. Hesse, Guilford, CT (US)

(73) Assignee: The Gillette Company, Boston, MA (US)

( * ) Notice: Subject to any disclaimer, the term of this patent is extended or adjusted under 35 U.S.C. 154(b) by 926 days.

This patent is subject to a terminal disclaimer.

(21) Appl. No.: 11/935,656

(22) Filed: Nov. 6, 2007

(65) Prior Publication Data

US 2008/0063904 A1    Mar. 13, 2008

Related U.S. Application Data

(62) Division of application No. 10/779,502, filed on Feb. 13, 2004, now Pat. No. 7,306,870.

(51) Int. Cl.
*H01M 8/04* (2006.01)

(52) U.S. Cl. ........ 429/515; 429/444; 429/506; 429/516; 95/90; 95/143; 96/108

(58) Field of Classification Search .............. 95/90, 143; 429/444, 506, 515, 516; 96/108
See application file for complete search history.

(56) References Cited

U.S. PATENT DOCUMENTS

| | | | |
|---|---|---|---|
| 2,057,165 A * | 10/1936 | Schreurs | 123/591 |
| 5,599,638 A | 2/1997 | Surampudi et al. | |
| 6,080,501 A | 6/2000 | Kelley et al. | |
| 6,125,131 A | 9/2000 | Brandes et al. | |
| 6,228,146 B1 * | 5/2001 | Kuespert | 95/46 |
| 6,904,943 B2 | 6/2005 | Dennis | |
| 7,501,008 B2 * | 3/2009 | Eshraghi et al. | 95/55 |
| 2003/0027022 A1 * | 2/2003 | Arana et al. | 429/17 |
| 2003/0082427 A1 * | 5/2003 | Prasad et al. | 429/34 |
| 2003/0138679 A1 * | 7/2003 | Prased et al. | 429/19 |
| 2003/0162070 A1 | 8/2003 | Hirsch et al. | |
| 2003/0165720 A1 | 9/2003 | DeFilippis | |
| 2003/0170522 A1 | 9/2003 | Hirsch | |
| 2003/0215686 A1 | 11/2003 | DeFilippis et al. | |

(Continued)

FOREIGN PATENT DOCUMENTS

EP    0 948 070    10/1999

(Continued)

OTHER PUBLICATIONS

Kallo et al., "Conductance and Methanol Crossover Investigation of Nafion Membranes in a Vapor-Fed DMFC", Journal of the Electrochemical Society, 150, A765-A769, 2003.

(Continued)

*Primary Examiner* — Robert J Hill, Jr.
*Assistant Examiner* — Christopher P Jones
(74) *Attorney, Agent, or Firm* — Fish & Richardson P.C.

(57) ABSTRACT

Fuel cells and methods of operating fuel cells are disclosed. In one aspect, the invention features a fuel source for a fuel cell including a housing having an outlet, a structure having a portion in the housing, the structure defining a cavity and having a surface defining an opening in fluid communication with the cavity, and a fuel in the housing. The fuel is in fluid communication with the outlet through the opening and the cavity of the structure.

24 Claims, 3 Drawing Sheets

U.S. PATENT DOCUMENTS

| | | | |
|---|---|---|---|
| 2004/0062973 | A1 | 4/2004 | Agnew et al. |
| 2004/0120889 | A1 | 6/2004 | Shah et al. |
| 2004/0191588 | A1* | 9/2004 | Eshraghi et al. ............... 429/19 |
| 2004/0224214 | A1* | 11/2004 | Vamos et al. ................... 429/38 |
| 2005/0118469 | A1 | 6/2005 | Leach et al. |
| 2006/0073365 | A1 | 4/2006 | Kaye |
| 2007/0077470 | A1* | 4/2007 | Adams et al. ................... 429/25 |
| 2008/0063904 | A1* | 3/2008 | Gilicinski et al. ............. 429/12 |

FOREIGN PATENT DOCUMENTS

| | | |
|---|---|---|
| EP | 1 329 972 | 7/2003 |
| WO | WO 03/096445 A1 | 11/2003 |
| WO | WO 2004/105166 | 12/2004 |
| WO | WO 2005/004258 | 1/2005 |

OTHER PUBLICATIONS

Hedenqvist et al., "Two-stage sorption in rubbery semicrystalline polymers: transport of primary alcohols in polyesteramide", Polymer, 43, 3061-3068, 2002.

Tiller et al., "Designing surfaces that kill bacteria on contact", PNAS, vol. 98, No. 11, 5981-5985, May 22, 2001.

Oh et al., "Prediction of sorption and flux of solvents through PDMS membrane", Polymer, 42, 6305-6312, 2001.

Klug et al., "Selective Removal of Methanol from Humid Air Streams Using a Water-Vapor-Purged Membrane Separator", Ind. Eng. Chem. Res., 40, 2685-2692, 2001.

Yu I. Tarasevich, "Interaction of Water and Other Polar Substances with Various Sorbents according to Calorimetric and Chromatographic Data", Theoretical and Experimental Chemistry, vol. 37, No. 4, 197-214, 2001.

Sanopoulou et al., "Study of the transition from Fickian to Case II sorption kinetics in the system poly(ethyl methacrylate)-liquid methyl alcohol", Polymer, 42, 1429-1439, 2001.

Fornasiero et al., Vapor-Sorption Equilibria for 4-Vinylpyridine-Based Copolymer and Cross-Linked Polymer/Alcohol Systems, Effect of 'Intramolecular Repulsion', Macromolecules, 33, 8435-8442, 2000.

Kamaruddin et al., "Sorption of Methanol/MTBE and Diffusion of Methanol in 6FDA-ODA Polyimide", Journal of Polymer Science: Part B: Polymer Physics, vol. 38, 2254-2267, 2000.

Lim et al., "Gas Permeable Membranes Composed of Carboxylated Poly(vinyl chloride) and Polyurethane", Bull. Korean Chem. Soc., vol. 20, No. 6, 672-676, 1999.

Doghieri et al., "Sorption and Diffusion of $n$-Aklanes and Alcohols in Poly (1-trimethylsily1-1-propyne)", American Chemical Society, 38-55, 1999.

Kim et al., "Measurements of Vapor Sorption Equilibria of Polymer Solutions and Comparative Correlation by GE-Models and Lattice Equations of State", Korean J. Chem. Eng., 15(2), 199-210, 1998.

Kim et al., "Measurement and correlation of vapor sorption equilibria of polymer solutions", Elsevier Science B.V., Fluid Phase Equilibria, 150-151, 679-686, 1998.

Rezac et al., "Effect of Colpolymer Composition on the Solubility and Diffusivity of Water and Methanol in a Series of Polyether Amides", Journal of Applied Polymer Science, vol. 65 (10), 1983-1993, 1997.

Favre et al., "Sorption, diffusion and vapor permeation of various penetrants through dense poly (dimethylsiloxane) membranes: a transport analysis", Elsevier Science B.V., Journal of Membrane Science, 92, 169-184, 1994.

Biren et al., "Effect of initial sample anisotropy on the solvent sorption kinetics of glassy poly (2-hydroxyethyl methacrylate)", Polymer, vol. 33, No. 3, 554-561, 1992.

Reisig et al., "Phase Equilibria of the Binary Systems $CF_4$+Methylpropane and $CF_4$+Dimethylpropane Measured in a New Low-Temperature High-Pressure Apparatus", Elsevier Science Publishers B.V., Fluid Phase Equilibria, 51, 269-283, 1989.

Baker et al., "Separation of Organic Vapors from Air", Journal of Membrane Science, 31, 259-271, 1987.

Nagy et al., "Effect on the Structure of Liquid Mixtures of the Equilibria of Polymer Gel-Aliphatic Alcohol-Water Systems", Acta Chimica Academiae Scientiarum Hungaricae, Tomus 74, (2), 233-238, 1972.

J.A. Barrie, "Diffusion of Methanol in Polydimethylsiloxane", Journal of Polymer Science, Part A-1, vol. 4, 3081-3088, 1966.

Kallo et al., "Conductance and Methanol Crossover Investigation of Nafion Membranes in a Vapor-Fed DMFC", Journal of the Electrochemical Society, 150, A765-A769, 2003.

Hedenqvist et al., "Two-stage sorption in rubbery semicrystalline polymers: transport of primary alcohols in polyesteramide", Polymer, 43, 3061-3068, 2002.

Tiller et al., "Designing surfaces that kill bacteria on contact", PNAS, vol. 98, No. 11, 5981-5985, May 22, 2001.

Oh et al., "Prediction of sorption and flux of solvents through PDMS membrane", Polymer, 42, 6305-6312, 2001.

\* cited by examiner

US 8,057,957 B2

FUEL SOURCE FOR A FUEL CELL

CROSS-REFERENCE TO RELATED APPLICATION

This application is a divisional application of and claims priority to U.S. Ser. No. 10/779,502, filed on Feb. 13, 2004, now U.S. Pat. No. 7,306,870, which is hereby incorporated by reference.

FIELD OF THE INVENTION

The invention relates to fuel cells and methods of operating the cells.

BACKGROUND

A fuel cell is a device capable of providing electrical energy from an electrochemical reaction, typically between two or more reactants. Generally, a fuel cell includes two electrodes, called an anode and a cathode, and a solid electrolyte disposed between the electrodes. The anode contains an anode catalyst, and the cathode contains a cathode catalyst. The electrolyte, such as an membrane electrolyte, is typically ionically conducting but electronically non-conducting. The electrodes and solid electrolyte can be disposed between two gas diffusion layers (GDLs).

During operation of the fuel cell, the reactants are introduced to the appropriate electrodes. At the anode, the reactant(s) (the anode reactant(s)) interacts with the anode catalyst and forms reaction intermediates, such as ions and electrons. The ionic reaction intermediates can flow from the anode, through the electrolyte, and to the cathode. The electrons, however, flow from the anode to the cathode through an external load electrically connecting the anode and the cathode. As electrons flow through the external load, electrical energy is provided. At the cathode, the cathode catalyst interacts with the other reactant(s) (the cathode reactant(s)), the intermediates formed at the anode, and the electrons to complete the fuel cell reaction.

For example, in one type of fuel cell, sometimes called a direct methanol fuel cell (DMFC), the anode reactants include methanol and water, and the cathode reactant includes oxygen (e.g., from air). At the anode, methanol is oxidized; and at the cathode, oxygen is reduced:

$$CH_3OH + H_2O \rightarrow CO_2 + 6H^+ + 6e^- \quad (1)$$

$$3/2 O_2 + 6H^+ 6e^- \rightarrow 3H_2O \quad (2)$$

$$CH_3OH + 3/2 O_2 \rightarrow CO_2 + 2H_2O \quad (3)$$

As shown in Equation (1), oxidation of methanol produces carbon dioxide, protons, and electrons. The protons flow from the anode, through the electrolyte, and to the cathode. The electrons flow from the anode to the cathode through an external load, thereby providing electrical energy. At the cathode, the protons and the electrons react with oxygen to form water (Equation 2). Equation 3 shows the overall fuel cell reaction.

SUMMARY

The invention relates to fuel cells and methods of operating the cells.

In one aspect, the invention features a fuel cell system, such as a DMFC system, having a fuel source including vapor transmission element(s) and a fuel (such as a fuel gel) capable of emitting gas phase fuel. The vapor transmission element(s) is capable of providing a high surface area, relatively constant interface with the fuel, thereby providing relatively constant delivery of fuel. Furthermore, the high surface area interface, combined with delivery of fuel in the gas phase, enhances the geometric and orientational versatility of the fuel source. The fuel source need not, for example, match the area footprint of the fuel cell. Vapor phase fuel delivery can also reduce migration of the fuel from the anode to the cathode (e.g., methanol crossover), which can cause parasitic loss (and reduced runtime) and mixed potentials at the cathode (and reduced output power.) What is more, the fuel source is capable of providing these features in a low volume design with good protection against leaks.

In some embodiments, the fuel cell system includes one or more gas movers that actively regulate flow of the gas phase fuel and further enhance the performance of the system, e.g., the orientational versatility of the fuel source. Alternatively or in addition, the fuel cell system can include one or more restrictive mechanisms that regulate flow of the gas phase fuel.

In one aspect, the invention features a fuel source for a fuel cell, including a housing having an outlet; a structure having a portion in the housing, the structure defining a cavity and having a surface defining an opening in fluid communication with the cavity; and a fuel in the housing, the fuel being in fluid communication with the outlet through the opening and the cavity of the structure.

Embodiments may include one or more of the following features. The structure includes an elongated tube and the cavity is a lumen of the tube. The housing has an inlet, and the fuel source further includes a diffusion tube in fluid communication with the inlet. The housing includes a fire-retardant material. The housing is configured to engage with a fuel cell system. The opening is configured to reduce flow of non-gaseous fuel through the opening. The fuel source includes a plurality of structures in the housing. The structure includes a hydrophobic material. The fuel source further includes a diffusion tube in fluid communication with the outlet and/or a valve (such as a slit valve) capable of selectively reducing fluid flow through the diffusion tube. The fuel source further includes a carbon dioxide getter in fluid communication with the fuel. The fuel includes a gel and/or a liquid. The fuel includes an alcohol, such as methanol.

In another aspect, the invention features a fuel source, including a housing having an outlet; a plurality of elongated tubes having portions in the housing, each tube defining a lumen and having a surface defining a plurality of openings; and a fuel comprising a gel in the housing, the fuel being in fluid communication with the outlet through the openings and the lumens of the tubes, wherein the fuel source is configured to be in fluid communication with a fuel system. The fuel can include methanol.

In another aspect, the invention features a fuel cell system, including a fuel cell; a fuel source in fluid communication with the fuel cell, the fuel source comprising a fuel comprising an alcohol; and a gas mover between the fuel cell and the fuel source along a fluid flow path.

Embodiments may include one or more of the following features. The fuel source includes a housing having an outlet, and the gas mover (such as a fan) is between the outlet and the fuel cell along the fluid flow path. The fuel source includes a housing having an inlet, and the gas mover is between the inlet and the fuel cell along the fluid flow path. The fuel cell system further includes a diffusion tube between the fuel cell and the fuel source along the fluid flow path. The fuel cell system further includes a valve between the fuel cell and the fuel source along the fluid flow path. The fuel source includes a gel.

The fuel source can include a housing having an outlet, a structure in the housing, the structure defining a cavity and having a surface defining an opening in fluid communication with the cavity; and a fuel in the housing, the fuel being in fluid communication with the outlet through the opening and the cavity of the structure.

The fuel source can include a housing having an outlet; a plurality of elongated tubes in the housing, each tube defining a lumen and having a surface defining a plurality of openings in fluid communication with the lumen; and a fuel comprising a gel in the housing, the fuel being in fluid communication with the outlet through the openings and the lumens of the tubes.

In another aspect, the invention features a method of operating a fuel cell system, including passing a fuel gas through an opening and a cavity of a structure having a portion in a fuel source; and contacting the fuel gas to an anode of a fuel cell.

Embodiments may include one or more of the following features. The method includes passing the fuel gas through a plurality of openings and a plurality of cavities of a plurality of structures having portions in the fuel source. The structures include elongated tubes. The method further includes passing the fuel gas through a diffusion tube; restricting the fuel gas with a valve; fanning the fuel gas from the fuel source to the fuel cell; and/or fanning a gas from an outlet of the fuel cell system to the fuel source, and contacting the gas to a fuel. The fuel source includes a liquid fuel or a gel fuel, such as one including methanol.

In another aspect, the invention features a method of operating a fuel cell system, including fanning a fuel gas from a fuel source to a fuel cell, the fuel source comprising an alcohol; and contacting the fuel gas to an anode of the fuel cell.

Embodiments may include one or more of the following features. The method further includes passing the fuel gas through a diffusion tube and/or reducing the flow of the fuel gas. The fuel source includes a liquid fuel or a gel fuel.

In another aspect, the invention features a method of operating a fuel cell system, including fanning a gas from an outlet of the fuel cell system to a fuel source; and contacting the gas with a fuel in the fuel source, the fuel comprising an alcohol.

The method can further include passing the gas through a diffusion tube, contacting the gas to a desiccant or a carbon dioxide getter, and/or reducing the flow of the gas. The fuel source can include a liquid fuel or a gel fuel.

In another aspect, the invention features a method of operating a fuel cell system, including passing a fuel gas through a plurality of openings and a plurality of cavities of a plurality of structures having portions in a fuel source; fanning the fuel gas from the fuel source to a fuel cell; and contacting the fuel gas to an anode of the fuel cell.

Embodiments may include one or more of the following features. The method further includes passing the fuel gas through a diffusion tube; reducing the flow of the fuel gas; fanning an outlet gas from the fuel cell to the fuel source, and contacting the outlet gas to a fuel in the fuel source; passing the outlet gas through a diffusion tube; and/or reducing the flow of the outlet gas. The fuel source includes a liquid fuel or a gel fuel.

Other aspects, features, and advantages of the invention will be apparent from the drawing, description, and claims.

DETAILED DESCRIPTION OF THE PREFERRED EMBODIMENTS

Figure 1:
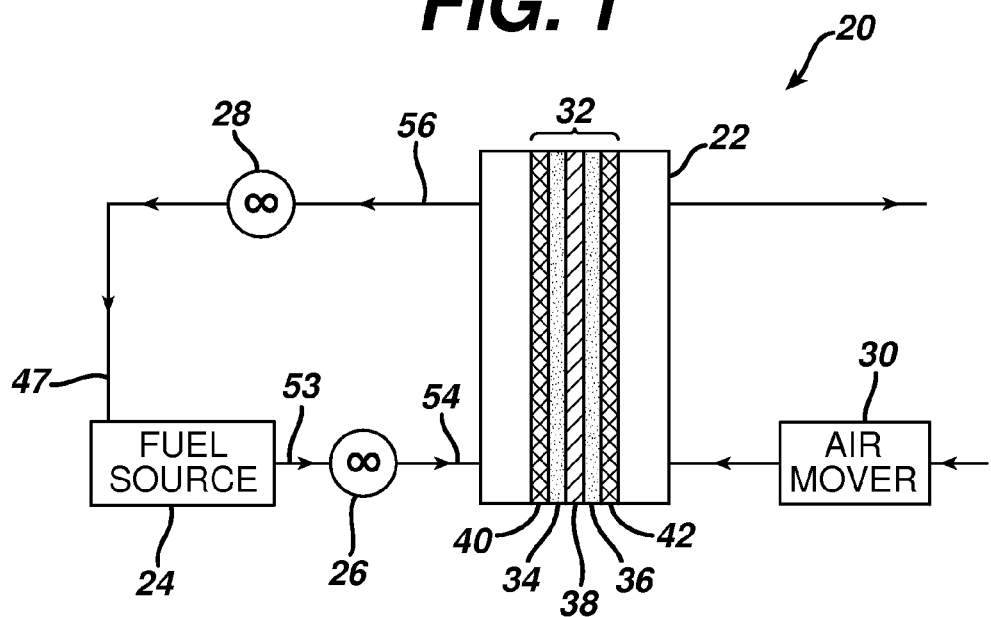
FIG. 1 is a schematic diagram of an embodiment of a fuel cell system.

Referring to FIG. 1, a fuel cell system 20, such as, a direct methanol fuel cell (DMFC) system, is shown. Fuel cell system 20 includes a fuel cell stack 22; a fuel source 24 (e.g., a cartridge containing methanol) in fluid communication with the fuel cell stack; two gas movers 26 and 28 in fluid communication with the fuel cell stack and the fuel source; and an air mover 30. For illustrative purposes, fuel cell stack 22 is shown having one fuel cell 32 (described below), but in other embodiments, the fuel cell stack includes a plurality of fuel cells 32, e.g., arranged in series or in parallel. Briefly, fuel cell 32 includes an anode 34, a cathode 36, and an electrolyte 38 between the anode and the cathode. Fuel cell 32 further includes a gas diffusion layer (GDL) 40 and 42 disposed on each side of the electrolyte 38, anode 34, and cathode 36 assembly. Air mover 30 is arranged to facilitate flow of a cathode reactant (e.g., air) to cathode 36, and flow of cathode product(s) (e.g., water) from the cathode. Gas movers 26 and 28 are arranged to facilitate flow of anode reactant(s) (e.g., methanol and water) from fuel source 24 to an anode inlet 54 and, flow of anode product(s) (e.g., carbon dioxide) away from an anode outlet 56 (as shown, to the fuel source).

Figure 2:
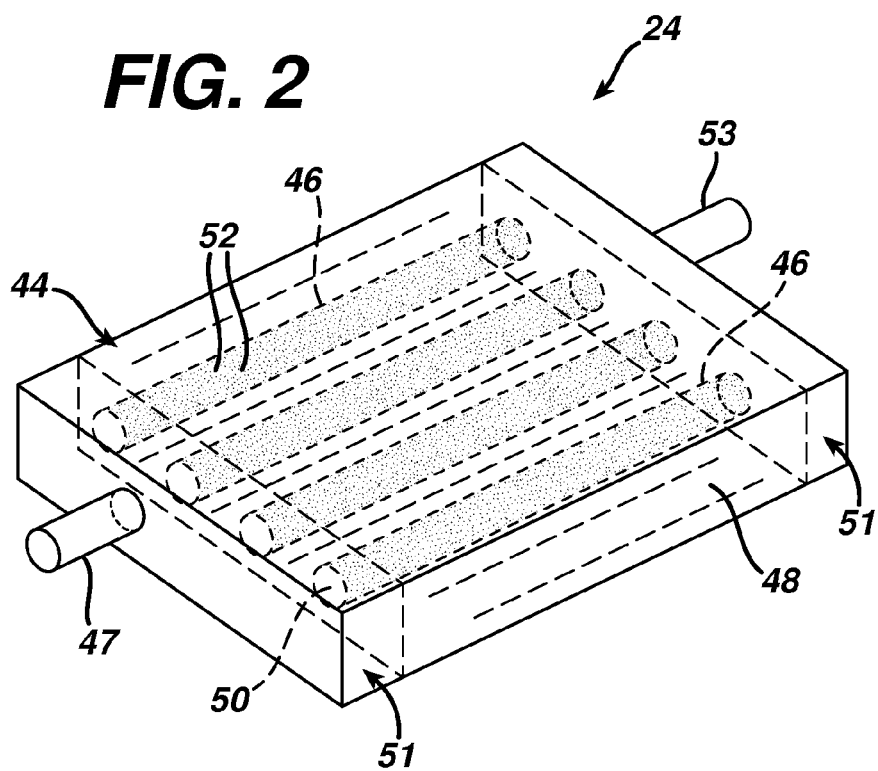
FIG. 2 is an illustration of an embodiment of a fuel source.

Referring to FIG. 2, fuel source 24 is configured to deliver vapor phase fuel to fuel cell stack 22. As shown, fuel source 24 is in the form of a prismatic cartridge including a housing 44 having an inlet 47 and an outlet 53. Within housing 44, fuel source 24 includes a fuel 48 and one or more (as shown, four) vapor transmission elements 46 in the fuel (e.g., surrounded by the fuel). In some embodiments, a vapor transmission element 46 is an elongated structure having an outer surface that defines a cavity 50 and is perforated with one or more openings 52. Cavity 50 and opening(s) 52 are in fluid communication with inlet 47 and outlet 53. A vapor transmission element can be, for example, an open-ended, perforated tubular structure defining a lumen, and in other embodiments, the vapor transmission element can have any cross-sectional configuration (e.g., triangular, square, rectangular, or regularly or irregularly polygonal having 3, 4, 5, 6, 7, 8 or more sides). Vapor transmission elements 46 can extend substantially an entire length of housing 44 or a portion thereof. The cross-sectional width or diameter of vapor transmission elements can be from about 0.01 micron to about 10 mm (such as from about 1 mm to about 5 mm, e.g., about 1 mm). Fuel source 24 can include vapor transmission elements 46 of the same size and configuration, or of different sizes and/or configurations. Vapor transmission elements 46 can be formed of a material, such as polypropylene, that is stable to long-term exposure to fuel 48. In some cases, such as in a DMFC system, the material used to form vapor transmission elements 46 is hydrophobic to reduce the likelihood of water condensation, thereby keeping water in the vapor phase.

Openings 52 are sized to allow gaseous fuel to pass through the openings while preventing non-gaseous fuel (e.g., liquid fuel) to pass, e.g., due to surface tension. Openings 52 can be, for example, circular, oval, regularly or irregularly polygonal having 3, 4, 5, 6, 7, 8 or more sides. In some cases, openings 52 have an average width or diameter from about 0.001 mm to about 5 mm; for example, the average width or diameter can be greater than or equal to about 0.05 mm, 0.5 mm, 1 mm, or 3 mm, and/or less than or equal to about 5 mm, 3 mm, 1 mm, 0.5 mm, or 0.05 mm. Openings 52 can be arranged in a regular pattern or randomly on vapor transmission elements 46.

Fuel source 24 can include any number or arrangement of vapor transmission elements 46. Vapor transmission elements 46 can be arranged irregularly or regularly, such as in an array of rows and columns. Vapor transmission element(s) 46 can contact each other and/or an interior surface of housing 44. In some embodiments, vapor transmission elements 46 are spaced from each other and/or housing 44. For example, vapor transmission elements 46 can be maintained in predetermined positions using a plastic wire frame or scaffold. The frame or scaffold also allow fuel source 24 to be loaded with fuel 48 while maintaining the positions of vapor transmission elements 46. If the frame or scaffold is removed after fuel loading, vapor transmission elements 46 may move and contact each other as fuel 48 is consumed during use.

Fuel 48 is capable of providing fuel in gaseous form to fuel cell stack 22. Fuel 48, such as one including an alcohol (e.g., methanol and/or ethanol) or a hydrocarbon, can be in the form of a liquid or a gel having a vapor pressure sufficient to provide gaseous fuel to stack 22. A fuel gel is a viscous material (e.g., from about 0.05 to about 200,000 centipoises) capable of emitting a pure and high concentration of gas-phase fuel molecules. The viscosity can be, for example, greater than or equal to about 10,000, 25,000, 50,000, 100,000, or 150,000 centipoises; and/or less than or equal to about 200,000, 150,000, 100,000, 50,000, or 25,000 centipoises. An example of a fuel gel composition includes a fuel (e.g., methanol); a diluent (e.g., deionized water); a thickener (e.g., Carbopol EZ-3, an acidic, hydrophobically-modified, cross-linked polyacrylate powder); and a neutralizing agent (e.g., tri-isopropanolamine). Other fuel gels are described in literature from Noveon that describe examples of the use of Carbopol rheology modifiers (manufactured by BF Goodrich); and exemplified by cooking fuels (e.g., available from Sterno, and formulation examples listed by Noveon). Fuel gels with sufficiently high viscosity can be constrained in housing 44, for example, by using plastic grids (not shown). As shown in FIG. 2, fuel 48 is constrained to define two end spaces 51, which provide two interfaces from which fuel vapor can be emitted. During use, gas-phase fuel molecules are capable of flowing from fuel 48, through openings 52 and cavities 50 of vapor transmission elements 46, through outlet 53, and to anode 34 of fuel cell 32.

The use of vapor transmission elements 46, in combination with a fuel capable of providing gas phase fuel, can enhance delivery of the fuel in fuel cell system 20 and its performance. Vapor transmission elements 46 can provide a high surface area interface with fuel 48 within a fuel source of any geometry, without increasing the footprint of the fuel source. For example, in a 4×8×1 cm prismatic fuel cartridge (volume of 32 cc), the surface area of the large area footprint of the cartridge is 32 cm$^2$ for certain designs of fuel cartridges. In comparison, using four vapor transmission elements (e.g., 2 mm diameter, slightly less than 8 cm length, 50% permeable) yields two 4×1 cm rectangular interfaces (8 cm$^2$ total from end spaces 51) plus the area provided by the vapor transmission elements (slightly less than 2.5 cm$^2$ each) to total slightly less than 18 cm$^2$. For ten vapor transmission elements, the total surface area is slightly less than 33 cm$^2$ (slightly less than 25 cm$^2$ for the elements plus 8 cm$^2$ for the two interfaces) at a volume cost of about 2.5 cc (less than 10% of the fuel cartridge volume). Furthermore, by providing a high surface area interface with fuel 48, without necessarily increasing the cross-sectional area of outlet 53, vapor transmission elements 46 enhances the versatility of fuel source 24, e.g., in terms of its geometry and/or orientation with respect to fuel cell stack 22. Fuel source 24 need not assume the same area footprint of fuel cell 32 (i.e., substantially match the active area of anode 34) for good performance. Also, since vapor transmission elements 46 can contact fuel 48, the interface between the vapor transmission elements 46 and the fuel can remain relatively constant, e.g., the fuel does not recede from the vapor transmission elements. As a result, as fuel 48 is consumed during use, fuel source 24 is capable of maintaining a constant fuel delivery rate, thereby allowing fuel cell stack 22 to provide a constant power output. Moreover, fuel source 24 is capable of providing the above features in a relatively simple (e.g., no moving parts), low volume design with good protection against leaks, particularly when fuel 48 includes a gel.

What is more, the performance of fuel system 20 can be further enhanced by using either or both gas movers 26 and 28. Gas movers 26 and 28 regulate flow of gas to and from fuel cell stack 22, and further allow fuel source 24 more versatility in its orientation with fuel cell stack 22. Gas mover 26 is positioned in a gas flow path between outlet 48 of fuel source 24 and anode inlet 54 of fuel cell stack 22. Gas mover 26 is capable of facilitating (e.g., drawing) flow of gas phase fuel from vapor transmission elements 46 to fuel cell 32. Gas mover 28 is positioned in a gas flow path between anode outlet 56 of fuel cell stack 22 and inlet 46 of fuel source 24. Gas mover 28 is capable of facilitating flow of anode outlet gases (e.g., unreacted fuel, carbon dioxide, and water) from fuel cell 32 to fuel source 24, e.g., to recycle water. Gas movers 26 and 28 can be, for example, a fan, such as one having a DC motor (available from Kot'l JinLong Machinery, Wenzhou, China PR) and an impeller. In other embodiments, gas movers 26 and 28 can be a diaphragm pump and its variations, or a peristaltic pump. Examples of pumps are described in U.S. Pat. No. 6,274,261; WO 00/36696; WO 01/97317; WO 01/97318; WO 01/97319; and WO 02/31906, all of which are hereby incorporated by reference in their entirety. Gas mover(s) 26 and/or 28 can be an integrated component of fuel cell stack 22, e.g., located in or on the stack, or the gas mover(s) can be a component of fuel source 24.

In some embodiments, fuel cell system 20 includes one or more restrictive mechanisms that partially or completely reduce (e.g., isolate) gas flow from and to fuel source 24 when the fuel cell system is not in use. Restricting flow of gas to and from fuel source 24 can reduce degradation of fuel 48 (e.g., oxidation by air) and unnecessary evaporation of fuel. Examples of restrictive mechanisms include a pressure-sensitive valve, such as a slit valve made from a polymer membrane, or a pop-up valve. The pressure-sensitive valve can automatically open when there is a pressure differential (e.g., when gas mover(s) 26 and/or 28 is activated), and close when the pressure differential is eliminated (e.g., the gas mover(s) is deactivated). Pressure-sensitive valves are described, for example, in U.S. Ser. No. 10/236,126, filed Sep. 6, 2002. Other examples of restrictive mechanisms include a gravity-driven flap, an electromechanical valve, or a mechanical valve, such as a manually operated latch or valve. The restrictive mechanisms can extend across the cross section of inlet 47 and/or outlet 53 of fuel source 24, and/or across any inlet(s) and/or outlet(s) of fuel cell stack 22, in any combination.

Figure 3:
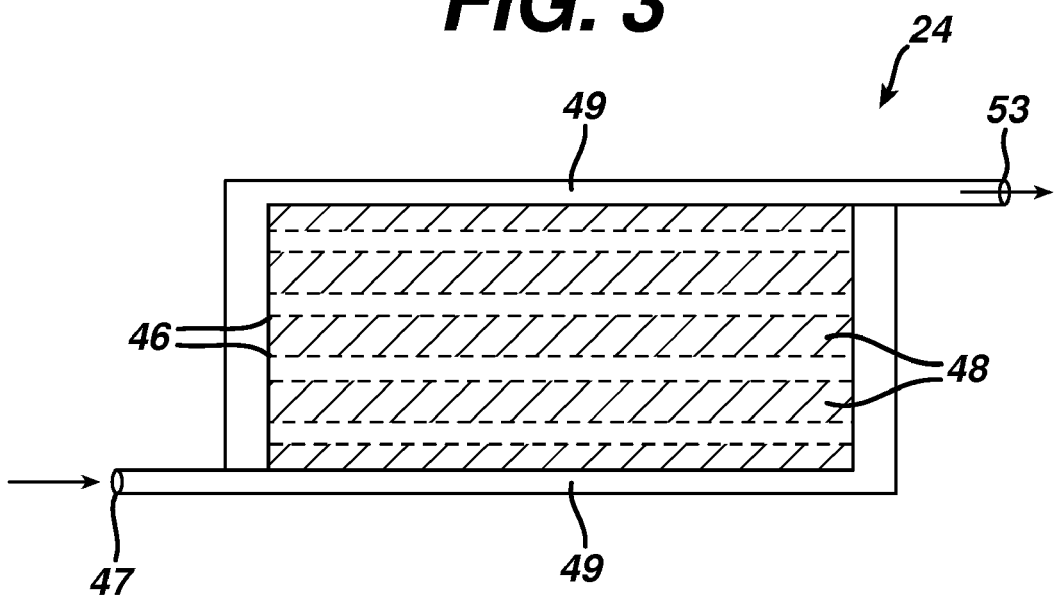
FIG. 3 is a schematic diagram of an embodiment of a fuel source.
Figure 4:
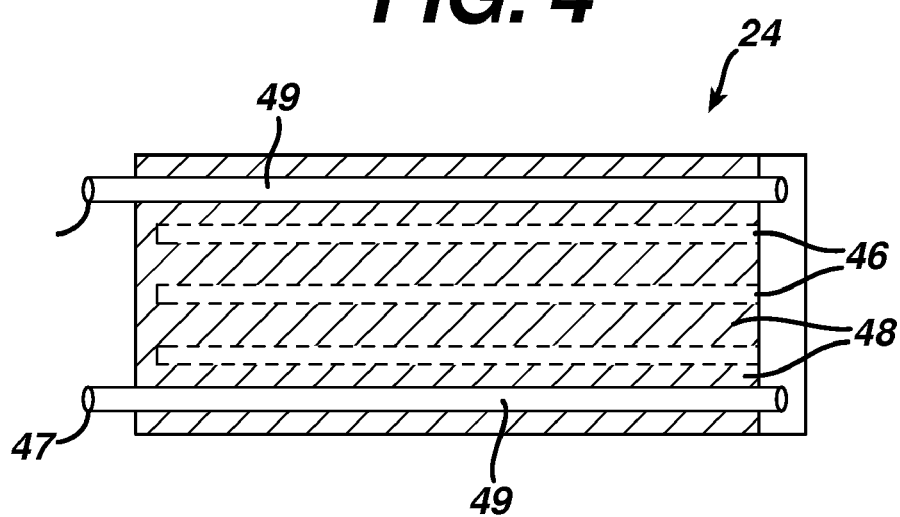
FIG. 4 is a schematic diagram of an embodiment of a fuel source.

Alternatively or in addition, referring to FIGS. 3 and 4, the restrictive mechanism can include a diffusion tube 49 in fluid communication with inlet 47 and/or outlet 48 of fuel source 24, and/or across any inlet(s) and/or outlet(s) of fuel cell stack 22, in any combination. A diffusion tube is a structure having a sufficient long cavity or lumen such that, absent a driving force (e.g., from a gas mover), gas diffusion through the tube is sufficiently low to provide an effective valve. In some embodiments, the length of the diffusion tube is greater than about half the length of the cartridge to the full length of the cartridge. More than one diffusion tube can be used, for example, by providing a manifold external to the cartridge on both sides, and multiple inlets and outlets. Diffusion tubes are also described in U.S. Ser. No. 09/400,020, filed Sep. 21, 1999, and U.S. Pat. Nos. 5,560,999 and 5,721,064. In some embodiments, the diffusion tube(s) includes one or more of the restrictive mechanisms (e.g., slit valve or flap valve) extending across the cross section of the tube(s). The restrictive mechanism(s) can shorten the length of the diffusion tube(s) and/or enhance isolation of fuel source 24. The diffusion tube(s) can be a component of fuel source 24 (e.g., integrally formed within or outside housing 44) or an integrated component of fuel cell stack 32. The restrictive mechanisms described above can be used in fuel cell systems with or without gas movers 26 and 28.

Air mover 30 is configured to facilitate flow of cathode reactant(s) (e.g., oxygen) to cathode 36 and flow of cathode product(s) (e.g., water) from the cathode. Air mover 30 can be the same as gas mover 26 or 28, e.g., a fan.

Referring again to FIG. 1, an example of fuel cell 32 will now be described. Fuel cell 32 includes electrolyte 38, anode 34 bonded on a first side of the electrolyte, and cathode 36 bonded on a second side of the electrolyte. Electrolyte 38, anode 34, and cathode 36 are disposed between gas diffusion layers (GDLs) 40 and 42.

Electrolyte 38 should be capable of allowing ions to flow therethrough while providing a substantial resistance to the flow of electrons. In some embodiments, electrolyte 38 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 38 can also be prepared from the commercial product GORE-SELECT, available from W. L. Gore & Associates (Elkton, Md.).

Anode 34 can be formed of a material, such as a catalyst, capable of interacting with methanol and water to form carbon dioxide, protons and electrons. Examples of such materials include, for example, platinum, platinum alloys (such as Pt—Ru, Pt—Mo, Pt—W, or Pt—Sn), platinum dispersed on carbon black. Anode 34 can further include an electrolyte, such as an ionomeric material, e.g., NAFION, that allows the anode to conduct protons. Alternatively, a suspension is applied to the surfaces of gas diffusion layers (described below) that face solid electrolyte 38, and the suspension is then dried. The method of preparing anode 34 may further include the use of pressure and temperature to achieve bonding.

Cathode 36 can be formed of a material, such as a catalyst, capable of interacting with oxygen, electrons and protons to form water. Examples of such materials include, for example, platinum, platinum alloys (such as Pt—Co, Pt—Cr, or Pt—Fe) and noble metals dispersed on carbon black. Cathode 36 can further include an electrolyte, such as an ionomeric material, e.g., NAFION, that allows the cathode to conduct protons. Cathode 36 can be prepared as described above with respect to anode 34.

Gas diffusion layers (GDLs) 40 and 42 can be formed of a material that is both gas and liquid permeable. Suitable GDLs are available from various companies such as Etek in Natick, Mass., SGL in Valencia, Calif., and Zoltek in St. Louis, Mo. GDLs 40 and 42 can be electrically conductive so that electrons can flow from anode 34 to an anode flow field plate (not shown) and from a cathode flow field plate (not shown) to cathode 36.

Other embodiments of direct methanol fuel cells and fuel cell systems, including methods of use, are described, for example, in "Fuel Cell Systems Explained", J. Laraminie, A. Dicks, Wiley, N.Y., 2000; "Direct Methanol Fuel Cells: From a Twentieth Century Electrochemist's Dream to a Twenty-first Century Emerging Technology", C. Lamy, J. Leger, S. Srinivasan, Modern Aspects of Electrochemistry, No. 34, edited by J. Bockris et al., Kluwer Academic/Plenum Publishers, New York (2001) pp. 53-118; and "Development of a Miniature Fuel Cell for Portable Applications", S. R. Narayanan, T. I. Valdez and F. Clara, in Direct Methanol Fuel Cells, S. R. Narayanan, S. Gottesfeld and T. Zawodzinski, Editors, Electrochemical Society Proceedings, 2001-4 (2001) Pennington, N.J., all hereby incorporated by reference.

OTHER EMBODIMENTS

Figure 5:
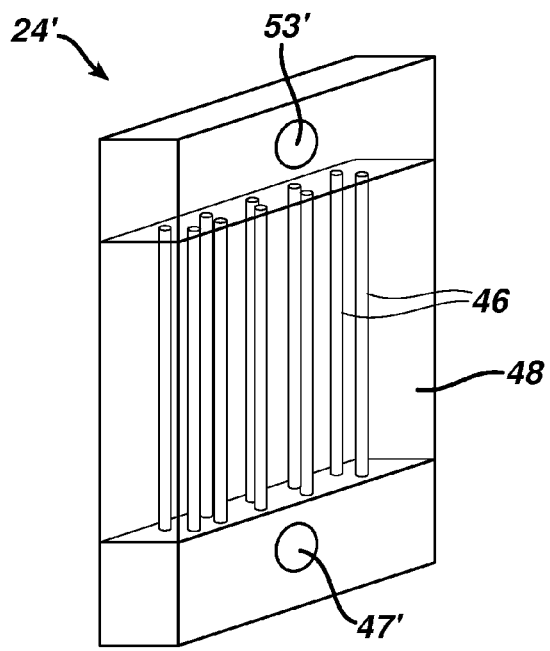
FIG. 5 is an illustration of an embodiment of a fuel source.

Housing 44 of fuel source 24 can be of any configuration capable of engaging with and providing a fuel to a fuel cell or a fuel cell stack. For example, referring to FIG. 5, a fuel source 24' includes an inlet 47' and an outlet 53' configured to engage with, e.g., snap fit with or lock with, a corresponding inlet and an outlet of a fuel cell or fuel cell stack. Source 24' can include any one or more of the restrictive mechanisms described above.

In some embodiments, housing 44 of fuel source 24 includes (e.g., formed from a composition including) a fire retardant (e.g., CN-2616, a nitrogen-phosphorus intumescent compound available from Great Lakes Chemical) to reduce the flammability of the fuel source.

Figure 6A:
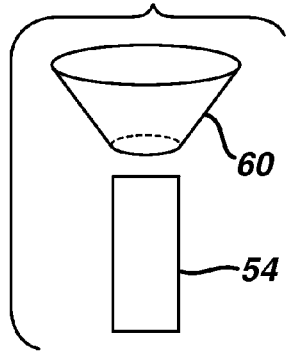
FIGS. 6A, 6B, and 6C are illustrations of gas diffusers.
Figure 6B:
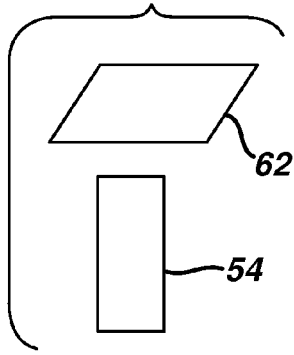
Figure 6C:
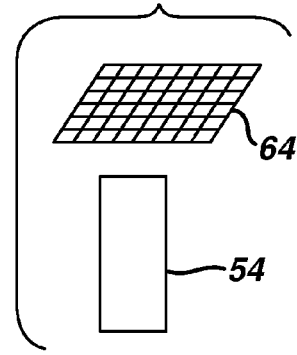

Anode inlet 54 can include one or more features to enhance even distribution of fuel over the active area of anode 54. For example, referring to FIGS. 6A, 6B, and 6C, the fuel cell system can include one or more gas diffusers 60, 62, and/or 64 for efficient vapor flow. The gas diffusers can be, for example, a frustoconical member (FIG. 6A), a plate (FIG. 6B), or a screen (FIG. 6C) that engages with or is near anode inlet 54. As gas exits anode inlet 54 and enters the anode chamber, the gas is dispersed over the anode chamber to reduce the occurrence of areas of low fuel concentration relative to other areas across the face of the MEA. The gas diffusers can be integral with the fuel source, the fuel cell, or the fuel cell stack. The gas diffusers can be used on the cathode side of a fuel cell system. Other methods of dispersing anode and/or cathode gases from a single inlet feed include splitting the inlet into multiple ports, e.g., using a manifold.

In some embodiments, a fuel cell system includes only one gas mover, e.g., gas mover 26 or gas mover 28.

In some embodiments, the fuel cell systems described herein include one or more emission control systems, such as those described in commonly assigned U.S. Ser. No. 10/438,031, filed on May 14, 2003. Briefly, the emission control systems are capable of reducing the amount of unreacted fuel and products of partial oxidation (e.g., formaldehyde and/or formic acid) released into the environment. Embodiments of emission control systems, including their placements in the fuel cell system, are described in U.S. Ser. No. 10/438,031.

Alternatively or in addition, the fuel cell system can include a material (e.g., a getter material) capable of reducing carbon dioxide emissions from fuel cell stack 22. The getter material, such as calcium oxide, can be located anywhere along a fluid flow path downstream of outlet 56. For example, fuel source 24 can contain the getter material in housing 44.

In some embodiments, the vapor transmission elements do not include any openings. The vapor transmission elements can be formed of a gas-permeable, liquid-impermeable material, such as a membrane of expanded polytetrafluoroethylene (PTFE), polypropylene, polystyrene, and polyethylene, as described in U.S. Patent Application Publication US 2003/0215686 A1, and Lim et al., Gas Permeable Membranes Composed of Carboxylated Poly(vinyl chloride) and Polyurethane, *Bull. Korean Chem. Soc.* 1999, Vol. 20, No. 6, 672-676, hereby incorporated by reference. The gas-permeable, liquid-impermeable material can be used with a gel fuel and/or a liquid fuel. The vapor transmission elements formed of a gas-permeable, liquid-impermeable material can be used with any embodiment of fuel source or fuel cell system described herein.

EXAMPLE

The following illustrative example describes a method of making a fuel gel. The fuel gel includes about 75.0% by weight of methanol; about 24.0% by weight of deionized water; about 0.5% by weight of Carbopol EZ-3; and about 0.5% by weight of tri-isopropanolamine.

The Carbopol EZ-3 thickener was added to the water without agitation and allowed to wet out for a few minutes. The methanol is then added, with agitation. Molten tri-isopropanolamine is then added with agitation. Other additives (such as a fire retardant, e.g., CN-2616) can also be added after this step. After the addition of tri-isopropanolamine, a clear gel forms, which can be poured or pumped into a fuel cartridge, allowed to cool, and gel further.

All references, such as patent applications, publications, and patents, referred to herein are incorporated by reference in their entirety.

Other embodiments are in the claims.

What is claimed is:

1. A fuel source for a fuel cell, comprising:
   a housing having an outlet for a gaseous fuel;
   a non-gaseous fuel in the housing, the fuel comprising an alcohol; and
   a vapor transmission element in the non-gaseous fuel, the non-gaseous fuel thus being outside of the vapor transmission element, the vapor transmission element comprising an internal cavity and openings that prevent the non-gaseous fuel from passing from outside the vapor transmission element into the cavity while allowing the non-gaseous fuel that converts to a gaseous fuel to pass into the cavity,
   wherein when the fuel source is in operation the non-gaseous fuel converts to gaseous fuel that passes through the openings into the cavity and then through the outlet of the housing.

2. The fuel source of claim 1, wherein the vapor transmission element comprises an elongated tube and the cavity is a lumen of the tube.

3. The fuel source of claim 1, wherein the openings are configured to reduce flow of non-gaseous fuel through the openings.

4. The fuel source of claim 1, comprising a plurality of the vapor transmission elements in the non-gaseous fuel.

5. The fuel source of claim 1, wherein the vapor transmission element comprises a hydrophobic material.

6. The fuel source of claim 1, wherein the vapor transmission element is a diffusion tube.

7. The fuel source of claim 6, further comprising a valve capable of selectively reducing the passage of gaseous fuel from the vapor transmission element and out of the outlet.

8. The fuel source of claim 7, wherein the valve comprises a slit valve.

9. The fuel source of claim 1, wherein the housing further comprises an inlet for non-aqueous fuel, and the fuel source further comprises a diffusion tube.

10. The fuel source of claim 1, wherein the non-gaseous fuel is a gel.

11. The fuel source of claim 1, wherein the non-gaseous fuel is a liquid.

12. The fuel source of claim 11, wherein the fuel is methanol.

13. The fuel source of claim 1, further comprising a carbon dioxide getter in fluid communication with the fuel.

14. The fuel source of claim 1, wherein the housing comprises a fire-retardant material.

15. The fuel source of claim 1, wherein the housing is configured to engage with a fuel cell system.

16. A fuel source for a fuel cell, comprising:
    a housing having an outlet;
    a structure in the housing, the structure defining an internal cavity and comprising an opening and a gas-permeable, liquid-impermeable material; and
    a fuel comprising an alcohol in the housing outside of the structure, the fuel being in communication with the outlet through the opening and the internal cavity of the structure.

17. The fuel source of claim 16, wherein the gas-permeable, liquid-impermeable material comprises polytetrafluoroethylene.

18. The fuel source of claim 16, wherein the fuel comprises a gel.

19. The fuel source of claim 16, comprising a plurality of said structures in the housing.

20. The fuel cell system of claim 16, wherein the fuel is methanol.

21. A fuel source for a fuel cell, comprising:
    a housing having a gas inlet, a gas outlet, and a flow path between the gas inlet and the gas outlet;
    a non-gaseous fuel in the housing, the fuel comprising an alcohol or a hydrocarbon; and
    a vapor transmission element in the non-gaseous fuel, the non-gaseous fuel thus being outside of the vapor transmission element, the vapor transmission element comprising (a) an internal cavity, the cavity being part of the flow path between the gas inlet and the gas outlet, and (b) openings that prevent the non-gaseous fuel from passing from outside the vapor transmission element into the cavity while allowing the non-gaseous fuel that converts to a gaseous fuel to pass from outside the vapor transmission element into the cavity,
    wherein when the fuel source is in operation the non-gaseous fuel converts to gaseous fuel that passes through the openings into the cavity and then through the gas outlet of the housing.

22. The fuel source of claim 21, wherein the vapor transmission element is a diffusion tube.

23. The fuel source of claim 21, wherein the fuel is methanol.

24. A fuel source for a fuel cell, comprising:
a housing having an outlet for a gaseous fuel;
a non-gaseous fuel in the housing, the fuel comprising an alcohol or a hydrocarbon; and
a vapor transmission element in the non-gaseous fuel, the non-gaseous fuel thus being outside of the vapor transmission element, the vapor transmission element comprising an elongated tube having two ends that are fixed within the housing, the elongated tube comprising an internal cavity and openings that prevent the non-gaseous fuel from passing from outside the vapor transmission element into the cavity while allowing the non-gaseous fuel that converts to a gaseous fuel to pass from outside the vapor transmission element into the cavity,
wherein when the fuel source is in operation the non-gaseous fuel converts to gaseous fuel that passes through the openings into the cavity and then through the outlet of the housing.

* * * * *

UNITED STATES PATENT AND TRADEMARK OFFICE
CERTIFICATE OF CORRECTION

| | | |
|---|---|---|
| PATENT NO. | : 8,057,957 B2 | Page 1 of 1 |
| APPLICATION NO. | : 11/935656 | |
| DATED | : November 15, 2011 | |
| INVENTOR(S) | : Andrew G. Gilicinski | |

It is certified that error appears in the above-identified patent and that said Letters Patent is hereby corrected as shown below:

In column 10, line 7, claim 9, delete "non-aqueous" and insert --non-gaseous--, therefor.

Signed and Sealed this
Twenty-fourth Day of January, 2012

David J. Kappos
*Director of the United States Patent and Trademark Office*